United States Patent [19]

Warlop et al.

[11] Patent Number: 4,998,269
[45] Date of Patent: Mar. 5, 1991

[54] DEVICE FOR ON-LINE MEASUREMENT OF THE GAMMA RADIATION EMITTED BY THE WATER IN A NUCLEAR REACTOR CIRCUIT, IN PARTICULAR THE PRIMARY COOLING CIRCUIT OF A PRESSURIZED WATER NUCLEAR REACTOR

[75] Inventors: Raymond Warlop, Grenoble; Francoise Montagnon, Neyron, both of France

[73] Assignees: Commissariat a l'Energie Atomique; Electricite de France (Service National), both of Paris, France

[21] Appl. No.: 325,579

[22] Filed: Mar. 20, 1989

[30] Foreign Application Priority Data

Mar. 22, 1988 [FR] France .................. 88 03694

[51] Int. Cl.$^5$ .............................. G21K 1/04
[52] U.S. Cl. ................... 378/151; 378/148; 378/207; 250/505.1
[58] Field of Search ............ 378/148, 149, 150, 157, 378/207; 250/356.1, 356.2, 505.1, 364; 376/245

[56] References Cited

U.S. PATENT DOCUMENTS 4,107,533  8/1978  Tabuchi et al. ............... 250/364
4,788,699 11/1988  Dobert et al. ................. 378/148

FOREIGN PATENT DOCUMENTS 0198342 10/1986 European Pat. Off. .
2099682  3/1972 France .
2231286 12/1974 France .
256036 12/1985 Japan .

Primary Examiner—Carolyn E. Fields
Assistant Examiner—David P. Porta
Attorney, Agent, or Firm—Blakely, Sokoloff, Taylor & Zafman

[57] ABSTRACT

A measurement device for on-line measurement of the gamma radiation emitted by the water in a nuclear reactor circuit, in particular the primary cooling circuit of a pressurized water nuclear reactor, the measurement device comprising:

at least one volume (101, 102) for metering the fluid to be analyzed;

a radiation detector (200) placed facing the volume; and a collimator interposed between the volume and the radiation detector, the collimator being constituted by a plurality of collimators (431, 432, 433) of different sizes mounted on a common member (400) which is movable relative to the volume-and-detector assembly, with the position of the moving member being determined automatically as a function of the measurement signal delivered by the detector so that the greater the intensity of the radiation revealed by the delivered signal, the smaller the size of the collimator interposed between the detector and the volume.

7 Claims, 3 Drawing Sheets

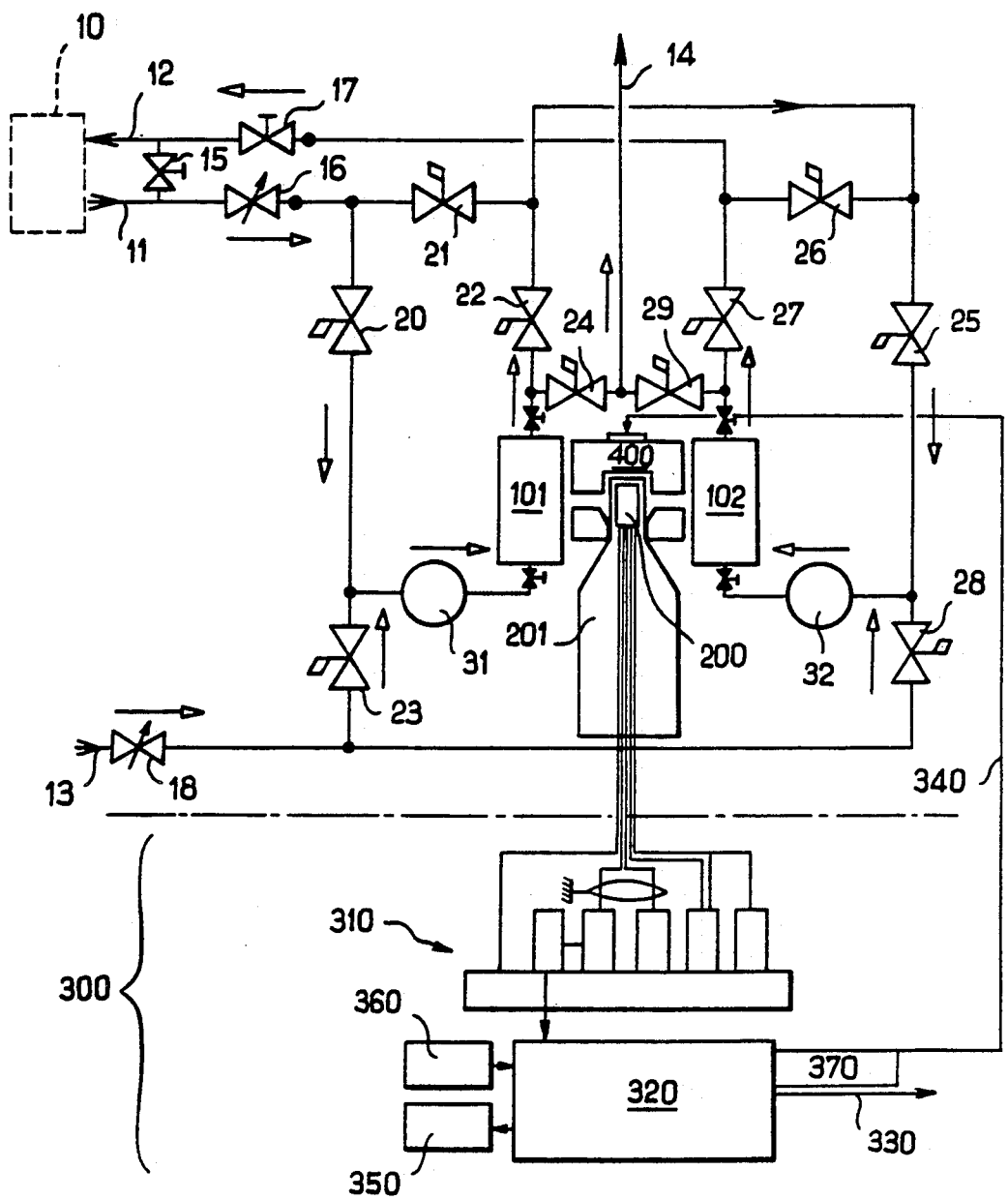
FIG_1

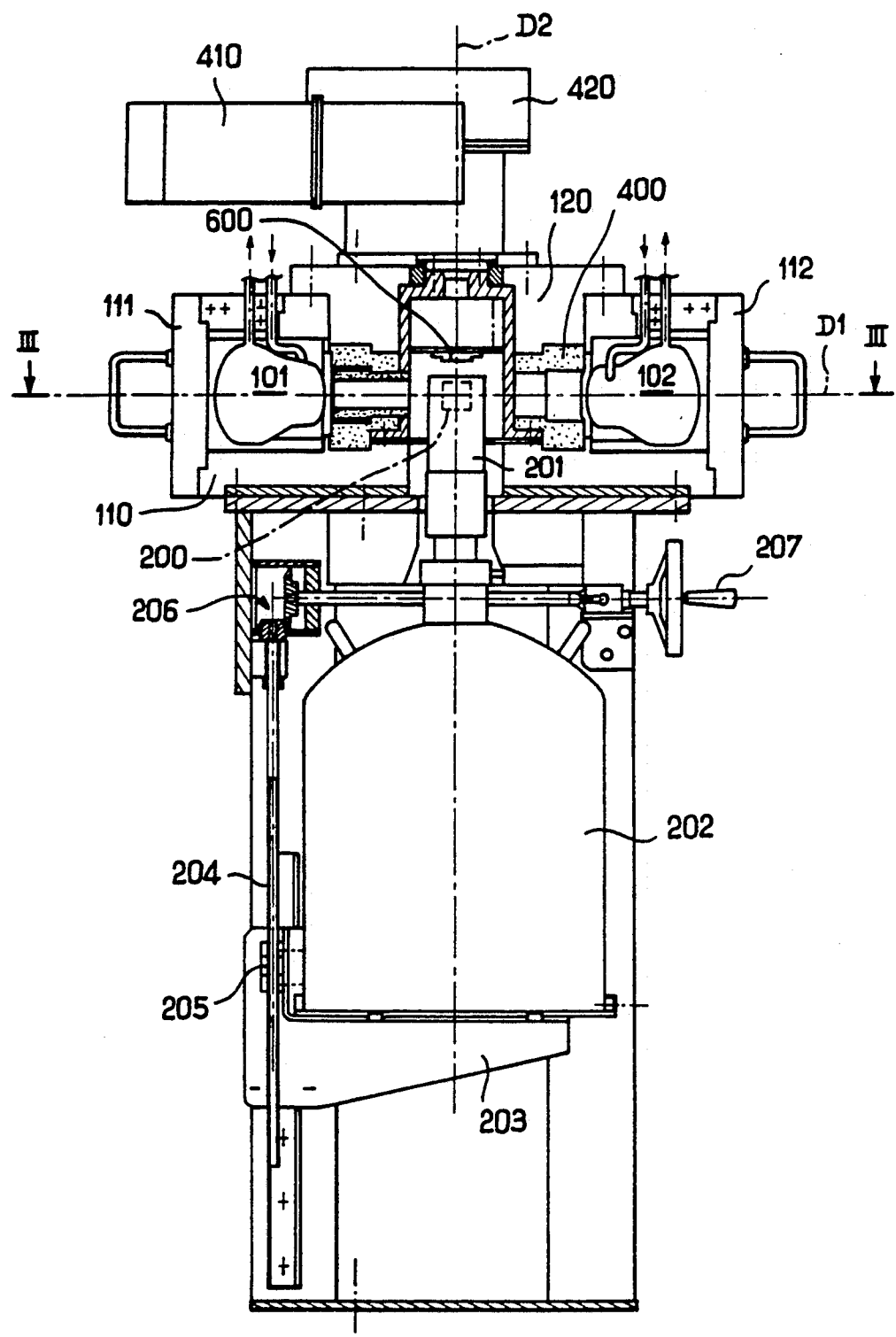
FIG_2

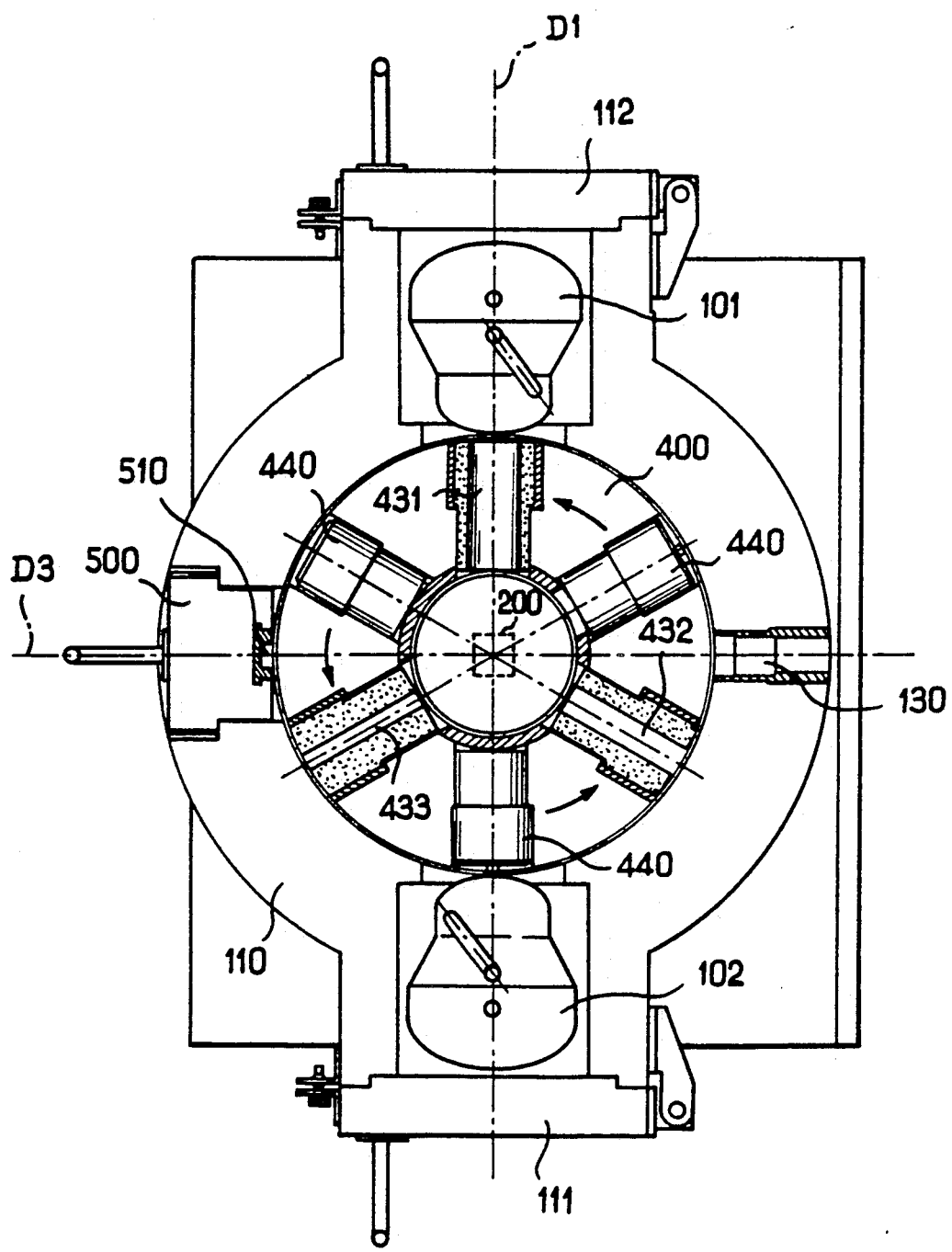
FIG_3

DEVICE FOR ON-LINE MEASUREMENT OF THE GAMMA RADIATION EMITTED BY THE WATER IN A NUCLEAR REACTOR CIRCUIT, IN PARTICULAR THE PRIMARY COOLING CIRCUIT OF A PRESSURIZED WATER NUCLEAR REACTOR

The present invention relates to a device for on-line measurement of the gamma radiation emitted by the water in a nuclear reactor circuit, in particular the primary cooling circuit of a pressurized water nuclear reactor.

BACKGROUND OF THE INVENTION

In order to monitor the state of the reactor core, in particular for the purpose of raising damaged sheaths to show up faults and to monitor changes therein, it has been the practice to use gamma spectrometry to analyze the various isotopes (of xenon, of krypton, of iodine) present in samples taken from the primary water circuit, with said samples being taken manually and individually.

Unlike the technique of detecting delayed neutrons as emitted by certain short-life isotopes, which technique is easily automated and also gives information about the integrity of the fuel, gamma spectrometry serves to show up faults which are at extremely low density and to provide highly accurate information about the state of the sheaths, thereby making it possible to specify, during operation, the number of faulty fuel rods and the degree to which their sheaths are damaged.

The frequency with which gamma activity is measured may vary from one or two samples per day or per week when the power station is operating under steady conditions, to one sample every 15 minutes to 3 hours during transient stages in power station operation if it is desired to track the bursts of activity that result therefrom.

Analysis by periodically taking samples, the sole technique which has been used in the past, gives rise to numerous difficulties: in addition to the tedious and expensive nature thereof (in particular because people are required to take the samples and to handle analysis equipment), the most significant drawback lies in the impossibility of having analysis results available immediately, firstly because of the time lost in taking samples and in transporting them, and secondly because of the time required for analyzing the samples and interpreting the results.

One of the objects of the present invention is to provide a measurement device enabling such gamma spectrometry of the cooling fluid to be performed in real time in a manner which is fully automated.

The major difficulty in providing an on-line device is avoiding the disturbing effects of corrosion products and of solid fission products depositing on the walls of the sampling volume.

Instead of the weekly or bi-weekly manual sampling operations currently recommended, the automatic device makes it possible to obtain at least two measurements per day without difficulty, and there is no additional constraint in recording the bursts of activity that follow operating transients, merely by triggering high frequency measurement sequences during said transient stages.

In addition, the possibility offered by the on-line gamma spectrometry technique of taking measurements at a high frequency makes it possible to seek correlations between the appearance of breaks and the operating parameters of the reactor, which are themselves acquired by the automatic device.

It is also shown that by virtue of the various characteristics of a device in accordance with the present invention, it is possible to obtain measurements which are extremely reliable, which do not have uncertainties due to decay periods or to metering, and which therefore make it possible to follow the state of the reactor core very accurately, without being hindered by corrosion products or solid fission products.

SUMMARY OF THE INVENTION

To this end, according to the present invention, the device comprises:
at least one volume for metering the fluid to be analyzed;
a radiation detector placed facing said volume; and
collimator means interposed between said volume and the radiation detector, said collimator means being constituted by a plurality of collimators of different sizes mounted on a common member which is movable relative to the volume-and-detector assembly.

According to various advantageous features of the present invention:
the position of the moving member is determined automatically as a function of the measurement signal delivered by the detector so that the greater the intensity of the radiation revealed by the delivered signal, the smaller the size of the collimator interposed between the detector and the volume;
the moving member includes at least one additional position for shutting off the volume from the detector and for placing a first calibrated source facing the detector in order to monitor the effectiveness thereof;
at least one second calibrated source is also provided for permanently irradiating the detector independently of the position of the moving member so as to provide an energy reference for the measurement system; in which case, it is preferable for the second source is disposed above or below the detector, with the detector being disposed in the center of the moving member which constitutes a turntable extending in a horizontal plane and rotating about a vertical axis, with the volume being disposed at a point on the periphery of said turntable;
two volumes are provided, one receiving the fluid to be analyzed at a known flow rate so as to enable the activity of the fluid to be measured in real time, and in particular its activity due to isotopes having short lifetimes, with the other operating as a storage volume for the purpose of providing deferred measurement of the activity of the fluid, and in particular of its activity due to isotopes having long lifetimes;
in which case, it is preferable for the moving member is in the form of a turntable extending in a horizontal plane and rotating about a vertical axis, with the volumes being disposed at diametrically opposite peripheral points of the turntable about the axis of the turntable, said turntable including three collimators disposed at 120° intervals and said turntable rotating through steps of 60° or through steps of a submultiple of 60°, so as to be able to place any one of the collimators in a position where it faces one of the two volumes only, depending on the angle of rotation of the turntable;

in the above case, when a calibrated first source is also provided, said source is placed at a point on the periphery of the turntable situated at 90° relative to the diameter of the two volumes, with the turntable being rotatable through steps of 30° or a submultiple of 30° so as to be able to place any one of its collimators facing one and only one of the three sources constituted by the two volumes and the calibrated source, as a function of the angle of rotation of the turntable.

BRIEF DESCRIPTION OF THE DRAWINGS

An embodiment of the invention is described by way of example with reference to the accompanying drawings, in which:

FIG. 1 is an overall view of a measurement device of the invention together with its associated hydraulic circuit;

FIG. 2 is an elevation view in section on line II—II of FIG. 3 through the measurement device per se; and FIG. 3 is a plan view in section on line III—III of FIG. 2 through said device.

DETAILED DESCRIPTION

In FIG. 1, reference 10 symbolizes the primary cooling water circuit of a pressurized water reactor, with water samples being taken from said circuit via a tapping point after reducing the pressure to about 5 bars and cooling it to about 25° C.

The water sampled in this way is conveyed to the measurement device by a duct 11, and after measurement, it is recycled to the primary circuit via an outlet duct 12.

A supply of deionized washing water 13 is also provided, serving to wash the hydraulic circuit of the measurement apparatus, with effluent being disposed of via a duct 14.

A series of valves 15 to 18 serve to feed the measurement device selectively either with water taken from the primary circuit or else with washing water.

The measurement device per se comprises two volumes 101 and 102 for metering the water to be analyzed.

Interference due to the walls of the metering volume becoming contaminated by corrosion products and by solid fission products is made negligible by:

an optimum volume-to-area ratio as seen by the detector; and a "high gloss" surface state for the curved walls.

The, or each, meter volume (101, 102) is specially shaped with suitably flared walls in order to optimize the volume to wall-area ratio so that the detector 200 can never see the side walls of the meter volumes even when looking through the largest diameter collimator. As a result, background noise due to back-scattered gamma radiation is minimized. The "high gloss" finish of the curved surfaces or walls perpendicular to the detector axis serves to further reduce the background noise.

The activity of the water in the meter volume 101 and 102 is measured by a detector 200 connected to a measurement and control circuit 300 which may be located at a distance from the measurement device, and which may even be common to a plurality of measurement devices. A turntable 400 is also provided whose function is explained below.

The gamma radiation detector is constituted by a hyperpure germanium crystal which transforms the gamma radiation it receives into variations in electrical voltage when it is biased by a very high voltage. This detector operates at the temperature of liquid nitrogen and for this purpose it is thermally connected to the contents of a cryostat 201 fed from a liquid nitrogen receptacle.

Valves 20 to 29 serve to feed a selected one of the two volumes 101 and 102 in a manner which depends on the position of the valves and may either be continuous (with the fluid flow being immediately recycled downstream), or else discontinuous with the volume being filled, and once filled being closed off upstream and downstream in order to retain fluid for a certain length of time for the purpose of deferred measurement of its activity.

In particular, on-line activity measurement is of particular interest for measuring the activity of isotopes having short lifetimes, whereas deferred measurement (e.g. after a decay period of about 10 hours) considerably improves the measurement of the activity of isotopes having long lifetimes, such as iodine 131, cesium 134, or cesium 137.

The various valves 21 to 29 may be controlled automatically from the control unit 300. Two flow rate meters 31 and 32 are also provided for monitoring the water flow rate through each of the two volumes 101 and 102.

The measurement and control assembly 300 includes a set of circuits 310 for power supply, amplification, and conversion purposes, and a processor unit 320 for processing the signals delivered by the sensor and for controlling the various members of the measurement device via a driver 370, in particular for controlling the valves 21 and 29 and for controlling the position of the turntable 400, via a link 340.

The assembly 300 also serves to measure metering losses by means of a fixed frequency pulse generator.

The information obtained may be transmitted over a serial link 330, and a display 350 is provided for giving an indication of the activity measured by the detector, and there is a keyboard 360 for entering various parameters and instructions into the unit 320. The processing unit 320:

serves to compensate for metering losses;

verifies that the various gamma rays of the measured nuclides are consistent after calculating the accuracy of the results;

provides the operator with magnitudes which are directly usable for monitoring the core, i.e. the equivalent instantaneous activity of iodine 131, and the equivalent accumulated activity of iodine 131;

verifies that the hydraulic and the electrical circuits are operating properly by periodically measuring fluid flow rates and electrical voltages, with any anomaly that could have a deleterious effect on measurement quality being marked on a log to invalidate the measurements; and compares on-line measurements with deferred measurements in order to propose a single table of activity measurements.

FIGS. 2 and 3 show the structure of the measurement device per se in greater detail. The two volumes 101 and 102 are located inside a lead body 110 supported by a frame which supports all of the fixed elements, together with a turntable 400 which is rotatable about a vertical axis D2 between the two volumes 101 and 102.

The frame is also provided with a moving carriage 203 supporting the cryostat 201 of the detector 200 together with its liquid nitrogen cylinder 202. The carriage 203 is movable in vertical translation by means of a screw 204 and nut 205 system driven by an angled transmission 206 and a handle 207. The function of this moving carriage is to enable the detector 200 to be placed inside the body 110 exactly on the intersection of the axis D1 (the common diameter of the two volumes 101 and 102) and the axis D2 (the central vertical axis between the volumes 101 and 102). To this end, the detector is inserted via an opening made in the bottom of the body 110, with the exact measurement position being defined, for example, by electrical abutment contacts placed in an appropriate location.

Access may be obtained to the two volumes 101 and 102 via respective doors 111 and 112 in order to enable them to be replaced and also to enable the sensitivity of the two measurement paths to be calibrated.

In the middle, the body 110 supports the turntable 400 and the entire assembly is closed by a lid 120 providing mechanical and biological protection and also supporting the members for mechanically controlling the turntable, i.e. a servo-motor 410 and an associated angle encoder 420.

The central turntable (FIG. 3) is fitted with three cylindrical collimators 431, 432, and 433 disposed at 120° intervals, said collimators having different diameters (e.g. diameters increasing from 15 mm, to 25 mm, to 45 mm), and also having three plugs 440 likewise disposed at 120° intervals which are offset by 60° from the three collimators.

The collimators 431, 432, and 433 are made of a heavy material (density of about 17) and serve to adapt the sensitivity of the measurements system to the activity to be measured. The plugs 440 are made of the same material as the collimators and serve to reduce background noise coming from one of the volumes while measurements are being performed on the opposite volume (e.g., in the position shown in FIG. 3, the plug 440 interposed between the volume 102 and the detector 200 reduces background noise due to this volume 102 while measurements are being performed on the activity of the fluid in the volume 101).

In addition to its two cavities receiving the volumes 101 and 102, the body 110 has a third peripheral cavity lying on an axis D3 perpendicular to the other two axes D1 and D2, and closed by a cylindrical plug 500 made of lead and supporting a calibrating source 510, e.g. a combined cerium 144 and europium 152 source, giving a fixed reference enabling the effectiveness of the detector 200 to be monitored.

Another source 600 is also provided (see FIG. 2) positioned above the detector 200 and placed on the vertical axis D2, said other source 600 permanently irradiating the detector. This source (which may be a combined americium 241 and cobalt 60 source) serves to provide an energy reference for the measurement system.

The turntable 400 is driven by the servo-motor 410 so as to rotate through steps of 30°. As a result it can take up twelve different positions which correspond to various different functions.

Starting from the position shown in FIG. 3, and assuming that rotation takes place in the direction shown by the arrows in said figure, these functions are as follows:

position shown: take measurements on volume 101 using the large collimator;

first step: neutral position;

second step: take measurements on volume 102 using the narrow collimator;

third step: take measurements on source 510 using the large collimator;

fourth step: take measurements on volume 101 using the medium collimator;

fifth step: neutral position;

sixth step: take measurements on volume 102 using the large collimator;

seventh step: take measurements on source 510 using the medium collimator;

eighth step: take measurements on volume 101 using the narrow collimator;

ninth step: neutral position;

tenth step: take measurements on volume 102 using the medium collimator;

eleventh step: take measurements on source 510 using the narrow collimator.

It may be observed that the three above-mentioned neutral positions could be used for measuring the activity of a source disposed diametrically opposite to the calibrating source 510. However, this position which is normally closed by the plug 130, is useful for visual verification that the detector 200 is properly positioned at the intersection of the three axes D1, D2, and D3.

We claim:

1. A measurement device for on-line measurement of gamma radiation emitted by water in a primary cooling circuit of a pressurized water nuclear reactor, the measurement device comprising:

at least one volume for metering a fluid to be analyzed;

a radiation detector placed facing said volume;

a first calibrated source facing the detector; and collimator means interposed between said at least one volume and the radiation detector, said collimator means being constituted by a plurality of collimators of different sizes mounted on a common member which is movable relative to a volume-and-detector assembly, with the position of the movable member being determined automatically as a function of a measurement signal delivered by the detector so that the greater the intensity of the radiation revealed by the delivered signal, the smaller the size of the collimator interposed between the detector and the at least one volume said movable member including at least one additional position for shutting off the at least one volume from the detector and for placing said first calibrated source facing the detector in order to monitor the effectiveness thereof.

2. A device according to claim 1, in which the at least one volume for metering has curved surfaces with a "high gloss" surface state, thereby reducing the interference due to contamination of the walls of the at least one volume for metering by corrosion products or by solid fission products to a negligible level.

3. A device according to claim 1, in which at least one second calibrated source is also provided for permanently irradiating the detector independently of the position of the movable member so as to provide an energy reference for the measurement system.

4. A device according to claim 3, in which the at least one second source is disposed above or below the detector, with the detector being disposed in the center of the movable member which constitutes a turntable extending in a horizontal plane and rotating about a vertical axis, with the at least one volume being disposed at a point on the periphery of said turntable.

5. A device according to claim 1, in which two volumes are provided, one receiving the fluid to be analyzed at a known flow rate so as to enable activity of the fluid to be measured in real time, its activity due to isotopes having short lifetimes, with the other operating as a storage volume for the purpose of providing deferred measurement of the activity of the fluid, of its activity due to isotopes having long lifetimes.

6. A device according to claim 5, in which the movable member is in the form of a turntable extending in a horizontal plane and rotating about a vertical axis, with the volumes being disposed at diametrically opposite peripheral points of the turntable about the axis of the turntable, said turntable including three collimators disposed at 120° intervals and said turntable rotating through steps of 60° or through steps of a submultiple of 60°, so as to be able to place any one of the collimators in a position where it faces one of the two volumes only, depending on the angle of rotation of the turntable.

7. A device according to claim 6, in which said first calibrated source is placed at a point on the periphery of the turntable situated at 90° relative to the diameter of the two volumes, with the turntable being rotatable through steps of 30° or a submultiple of 30° so as to be able to place any one of its collimators facing one and only one of the three sources constituted by the two volumes and the calibrated source, as a function of the angle of rotation of the turntable.

* * * * *